(12) United States Patent
Moon et al.

(10) Patent No.: US 9,791,609 B2
(45) Date of Patent: Oct. 17, 2017

(54) POLARIZATION FILM AND DISPLAY DEVICE

(71) Applicant: SAMSUNG ELECTRONICS CO., LTD., Suwon-si, Gyeonggi-do (KR)

(72) Inventors: Deuk Kyu Moon, Seoul (KR); Sang Ho Park, Anyang-si (KR); Yong Joo Lee, Suwon-si (KR); Jong Hoon Won, Yongin-si (KR); Hyeon Ho Choi, Seoul (KR); Myung Man Kim, Suwon-si (KR); Young Hwan Kim, Seongnam-si (KR); Feifei Fang, Suwon-si (KR); Myung Sup Jung, Seongnam-si (KR)

(73) Assignee: SAMSUNG ELECTRONICS CO., LTD., Gyeonggi-Do (KR)

(*) Notice: Subject to any disclaimer, the term of this patent is extended or adjusted under 35 U.S.C. 154(b) by 777 days.

(21) Appl. No.: 14/090,007

(22) Filed: Nov. 26, 2013

(65) Prior Publication Data

US 2014/0254012 A1    Sep. 11, 2014

(30) Foreign Application Priority Data

Mar. 11, 2013    (KR) .................. 10-2013-0025848

(51) Int. Cl.
*G02B 5/30* (2006.01)
*G02B 1/08* (2006.01)

(52) U.S. Cl.
CPC ............... *G02B 5/305* (2013.01); *G02B 1/08* (2013.01); *Y10T 428/1041* (2015.01)

(58) Field of Classification Search
CPC ...... G02B 1/08; G02B 5/305; Y10T 428/1041
See application file for complete search history.

(56) References Cited

U.S. PATENT DOCUMENTS 3,413,075 A * 11/1968 Rotcop ................. C09B 31/062
                                                                     534/573
5,354,369 A    10/1994 Shimomura et al.
(Continued)

FOREIGN PATENT DOCUMENTS

EP         0569864 A1     5/1993
JP      2005-255846 A     9/2005
(Continued)

OTHER PUBLICATIONS

4-Acetamidophenol, N-Acetyl-4-aminophenol, Sigma-Aldrich, Sep. 2016.*
(Continued)

*Primary Examiner* — Sophie Hon
(74) *Attorney, Agent, or Firm* — Cantor Colburn LLP (57) ABSTRACT

A polarization film, including: a hydrophobic polymer resin and a dichroic dye represented by Chemical Formula 1:

Chemical Formula 1

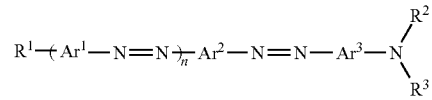

wherein in Chemical Formula 1,
  wherein, in Chemical Formula 1,
  $Ar^1$ is a substituted or unsubstituted C6 to C15 arylene group,
$Ar^2$ is a C6 to C15 arylene group substituted with at least one of a substituted or unsubstituted C1 to C20 alkyl group, a substituted or unsubstituted C1 to C20 alkoxy group, a halogen atom and a halogen-containing group,
$Ar^3$ is a C6 to C15 arylene group substituted with an amide group, (Continued)

$R^1$ is a substituted or unsubstituted C1 to C20 alkyl group or a substituted or unsubstituted C1 to C20 alkoxy group, $R^2$ and $R^3$ are each independently a substituted or unsubstituted C1 to C20 alkyl group, or $R^2$ and $R^3$ are linked to each other to form a ring, and n is 1 or 2.

18 Claims, 4 Drawing Sheets

(56) References Cited

U.S. PATENT DOCUMENTS

| | | | | |
|---|---|---|---|---|
| 2011/0051052 | A1* | 3/2011 | Tasaka | C09B 31/043 349/96 |
| 2012/0050652 | A1* | 3/2012 | Chang | B29C 43/003 349/96 |
| 2012/0139964 | A1* | 6/2012 | Han | G02F 1/133526 345/690 |
| 2013/0092874 | A1 | 4/2013 | Bacher et al. | |

FOREIGN PATENT DOCUMENTS

| | | |
|---|---|---|
| JP | 2011-048310 A | 3/2011 |
| JP | 2011-048311 A | 3/2011 |
| WO | 2011157614 A1 | 12/2011 |

OTHER PUBLICATIONS

Karst et al, "Using the Solubility Parameter to Explain Disperse Dye Sorption on Polylactide", Journal of Applied Polymer Science, vol. 96, 2005, pp. 416-422.

Robert F. Fedors, "A Method for Estimating Both the Solubility Parameters and Molar Volumes of Liquids", Polymer Engineering and Science, vol. 14, No. 2, Feb. 1974, pp. 147-154.

* cited by examiner

POLARIZATION FILM AND DISPLAY DEVICE

This application claims priority to and the benefit of Korean Patent Application No. 10-2013-0025848, filed on Mar. 11, 2013, and all the benefits accruing therefrom under 35 U.S.C. §119, the content of which is incorporated herein in its entirety by reference.

BACKGROUND

1. Field

A polarization film and a display device including the polarization film are disclosed.

2. Description of the Related Art

A display device such as a liquid crystal display ("LCD") and an organic light emitting diode ("OLED") device includes a polarization plate attached to the outside of a display panel. The polarization plate transmits light of a specific wavelength and absorbs or reflects light of other wavelengths. Thus, the polarization plate may control the direction of incident light on the display panel or light emitted from the display panel.

The polarization plate generally includes a polarizer and a protective layer for the polarizer. The polarizer may be formed, for example, from polyvinyl alcohol ("PVA"), and the protective layer may be formed, for example, from triacetyl cellulose ("TAC").

However, manufacture of the polarization plate including the polarizer and the protective layer is complicated and expensive, and also results in a thick polarization plate which leads to an increased thickness of a display device.

Accordingly, there remains a need in the art for a polarization film that does not require a protective layer.

SUMMARY

An embodiment provides a polarization film that may have improved polarization properties.

Another embodiment provides a display device including the polarization film.

A polarization film according to an embodiment includes a hydrophobic polymer resin and a dichroic dye represented by Chemical Formula 1, Chemical Formula 1

Wherein, in Chemical Formula 1, $Ar^1$ is a substituted or unsubstituted C6 to C15 arylene group, $Ar^2$ is a C6 to C15 arylene group substituted with at least one of a substituted or unsubstituted C1 to C20 alkyl group, a substituted or unsubstituted C1 to C20 alkoxy group, a halogen atom and a halogen-containing group, $Ar^3$ is a C6 to C15 arylene group substituted with an amide group, $R^1$ is a substituted or unsubstituted C1 to C20 alkyl group or a substituted or unsubstituted C1 to C20 alkoxy group, $R^2$ and $R^3$ are each independently a substituted or unsubstituted C1 to C20 alkyl group, or $R^2$ and $R^3$ are linked to each other to form a ring, and n is 1 or 2.

The C6 to C15 arylene group may be a phenylene group, a naphthylene group, or a biphenylene group.

In Chemical Formula 1, $Ar^3$ may be a C6 to C15 arylene group substituted with an acetamide group.

In Chemical Formula 1, $Ar^3$ may be a C6 to C15 arylene group substituted with an amide group and a substituted or unsubstituted C1 to C20 alkoxy group.

The dichroic dye may be represented by Chemical Formula 2.

Chemical Formula 2

In Chemical Formula 2, $Ar^1$ is a substituted or unsubstituted C6 to C15 arylene group, $R^a$ is a substituted or unsubstituted C1 to C20 alkyl group, a substituted or unsubstituted C1 to C20 alkoxy group, a halogen atom, or a halogen-containing group, $R^b$ is hydrogen or a substituted or unsubstituted C1 to C20 alkoxy group, $R^c$ is a substituted or unsubstituted C1 to C20 alkyl group,

$R^1$ is a substituted or unsubstituted C1 to C20 alkyl group or a substituted or unsubstituted C1 to C20 alkoxy group, $R^2$ and $R^3$ are each independently a substituted or unsubstituted C1 to C20 alkyl group, or $R^2$ and $R^3$ are linked to each other to form a ring, and n is 1 or 2.

The dichroic dye may be represented by one of Chemical Formulae 3 to 6.

Chemical Formula 3

-continued

Chemical Formula 4

Chemical Formula 5

Chemical Formula 6

The hydrophobic polymer resin may include a polyolefin, a polyamide, a polyacryl, a polystyrene, a polyester, a polycarbonate, a polyimide, a copolymer thereof, or a combination thereof.

The hydrophobic polymer resin may be a polyolefin, and the polyolefin may be a combination of polypropylene and a polyethylene-polypropylene copolymer.

The dichroic dye may have a solubility parameter of less than or equal to about 24.

A difference between a solubility parameter of the hydrophobic polymer resin and a solubility parameter of the dichroic dye may be less than or equal to about 8.0.

The dichroic dye may be present in an amount of about 0.01 to about 5 parts by weight based on a total of 100 parts by weight of the hydrophobic polymer resin.

The dichroic dye may be present in an amount of about 0.05 to about 1 parts by weight based on a total of 100 parts by weight of the hydrophobic polymer resin.

The polarization film may have a dichroic ratio of about 3 to about 10 at maximum absorption wavelength in a visible ray region, wherein the dichroic ratio is represented by Equation 1.

$$DR = \text{Log}(1/T_\perp)/\text{Log}(1/T_\parallel) \quad \text{Equation 1}$$

In Equation 1,

DR denotes a dichroic ratio of a polarization film, $T_\parallel$ is transmittance of light entering parallel to the transmissive axis of a polarization film, and $T_\perp$ is transmittance of light entering perpendicular to the transmissive axis of the polarization film.

The polarization film may have polarization efficiency of greater than or equal to about 90%, wherein polarization efficiency is obtained by Equation 2.

$$PE\ (\%) = [(T_\parallel - T_\perp)/(T_\parallel + T_\perp)]^{1/2} \times 100 \quad \text{Equation 2}$$

In Equation 2,

PE denotes polarization efficiency, $T_\parallel$ is transmittance of light entering parallel to the transmissive axis of a polarization film, and $T_\perp$ is transmittance of light entering perpendicular to the transmissive axis of the polarization film.

The polarization film may be a melt blend of the hydrophobic polymer resin and the dichroic dye.

The dichroic dye may be distributed in the hydrophobic polymer resin, and the hydrophobic polymer resin may be elongated in a uniaxial direction by about 400 to about 1,000%.

According to another embodiment, an antireflective film including the polarization film and a compensation film is provided.

According to yet another embodiment, a display device including the polarization film is provided.

The display device may be a liquid crystal display or an organic light emitting diode device.

BRIEF DESCRIPTION OF THE DRAWINGS

These and other embodiments will become apparent and more readily appreciated from the following description taken in conjunction with the accompanying drawings in which.

DETAILED DESCRIPTION

This disclosure will be described more fully hereinafter with reference to the accompanying drawings, in which exemplary embodiments of the present disclosure are shown. This disclosure may, however, be embodied in many different forms and should not be construed as limited to the exemplary embodiments set forth herein; rather, these embodiments are provided so that this disclosure will fully convey the scope of the invention to those skilled in the art. Thus, in some exemplary embodiments, well known technologies are not specifically explained to avoid ambiguous understanding of the present invention. Unless otherwise defined, all terms used in the specification (including technical and scientific terms) may be used with meanings commonly understood by a person having ordinary knowledge in the art. Further, unless explicitly defined to the contrary, the terms defined in a generally-used dictionary are not ideally or excessively interpreted. In addition, unless explicitly described to the contrary, the word "comprise" and variations such as "comprises" or "comprising" will be understood to imply the inclusion of stated elements but not the exclusion of any other elements.

Unless specifically described to the contrary, a singular form includes a plural form.

The exemplary embodiments of the present invention described in the specification are explained referring to ideal exemplary drawings of schematic diagrams. Therefore, the parts exemplified in the drawings have outline properties and they are not to limit the categories of the invention. The same reference numerals designate the same constituent elements throughout the specification.

As used herein, the term "and/or" includes any and all combinations of one or more of the associated listed items. Expressions such as "at least one of," when preceding a list of elements, modify the entire list of elements and do not modify the individual elements of the list.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer, or section. Thus, a first element, component, region, layer, or section discussed below could be termed a second element, component, region, layer, or section without departing from the teachings of the present embodiments.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

The terminology used herein is for the purpose of describing particular embodiments only and is not intended to be limiting. As used herein, the singular forms "a," "an" and "the" are intended to include the plural forms as well, unless the context clearly indicates otherwise. Unless specified otherwise, the term "or" means "and/or".

As used herein, a "mixture" refers to a combination of components in any form, for example solution, alloy, or solid/liquid.

As used herein, when a definition is not otherwise provided, the term 'substituted' refers to a compound or group substituted with at least one substituent selected from a halogen (F, Br, Cl, or I), a C1 to C20 alkoxy group, a C1 to C20 alkylthio group, a cyano group (—CN), an amino group (—NRR', wherein R and R' are independently hydrogen or a C1 to C6 alkyl group), a C1 to C20 ester group, a C1 to C20 alkyl group, a C1 to C20 aryl group, a C2 to C20 alkenyl group, a C2 to C20 alkynyl group, a hydroxy group (—OH), a nitro group (—NO$_2$), an azido group (—N$_3$), an amidino group (—C(=NH)NH$_2$), a hydrazine group (—NHNH$_2$), a hydrazono group (=N(NH$_2$)), an aldehyde group (—C(=O)H), a carbamoyl group (—C(=O)NH$_2$), a thiol group (—SH), an ester group (—C(=O)OR, wherein R is a C1 to C6 alkyl group or a C6 to C12 aryl group), a carboxyl group (—C(=O)OH) or a salt thereof (—C(=O)OM, wherein M is an organic or inorganic cation), a sulfonic acid group (—SO$_3$H) or a salt thereof (—SO$_3$M, wherein M is an organic or inorganic cation), a phosphoric acid group (—PO$_3$H$_2$) or a salt thereof (—PO$_3$MH or —PO$_3$M$_2$, wherein M is an organic or inorganic cation), and a combination thereof, in place of at least one hydrogen of the compound.

As used herein, the term "alkyl" refers to a monovalent group derived from a straight or branched chain saturated aliphatic hydrocarbon, and having a specified number of carbon atoms. Alkyl groups include, for example, methyl, ethyl, propyl, isopropyl, and hexyl.

As used herein, the term "alkenyl" refers to a monovalent group derived from a straight or branched chain saturated aliphatic hydrocarbon, having at least one double bond, and having a specified number of carbon atoms. Alkenyl groups include, for example, ethenyl and propenyl.

As used herein, the term "alkynyl" refers to a monovalent group derived from a straight or branched chain saturated aliphatic hydrocarbon, having at least one triple bond, and having a specified number of carbon atoms. Alkynyl groups include, for example, ethynyl and propynyl.

As used herein, the term "alkoxy" indicates "alkyl-O—", wherein the alkyl is the same as described above and having the specified number of carbon atoms. Non-limiting examples of the alkoxy group include methoxy, ethoxy, 1-propoxy, 2-propoxy, n-butoxy, t-butoxy, pentyloxy, hexyloxy, cyclopropoxy, and cyclohexyloxy.

As used herein, the term "alkylthio" indicates "alkyl-S—", wherein the alkyl is the same as described above and having the specified number of carbon atoms. Non-limiting examples of the alkylthio group include methylthio, ethylthio, 1-propylthio, 2-propylthio, n-butylthio, t-butylthio, pentylthio, hexylthio, cyclopropylthio, and cyclohexylthio.

As used herein, the term "aryl" group, which is used alone or in combination, indicates a monovalent group derived from an aromatic hydrocarbon containing at least one ring, and having the specified number of carbon atoms. As used herein, the term "aryl" is construed as including a group with an aromatic ring fused to at least one cycloalkyl ring. Non-limiting examples of the "aryl" group include phenyl, naphthyl, and tetrahydronaphthyl.

As used herein, the term "arylene" indicates a divalent group formed by the removal of two hydrogen atoms from one or more rings of an aromatic hydrocarbon, wherein the hydrogen atoms may be removed from the same or different rings, each of which rings may be aromatic or nonaromatic. Non-limiting examples of the "arylene" group include a phenylene group, a naphthylene group, or a biphenylene group.

Hereinafter, a polarization film according to an embodiment is described.

Figure 1:
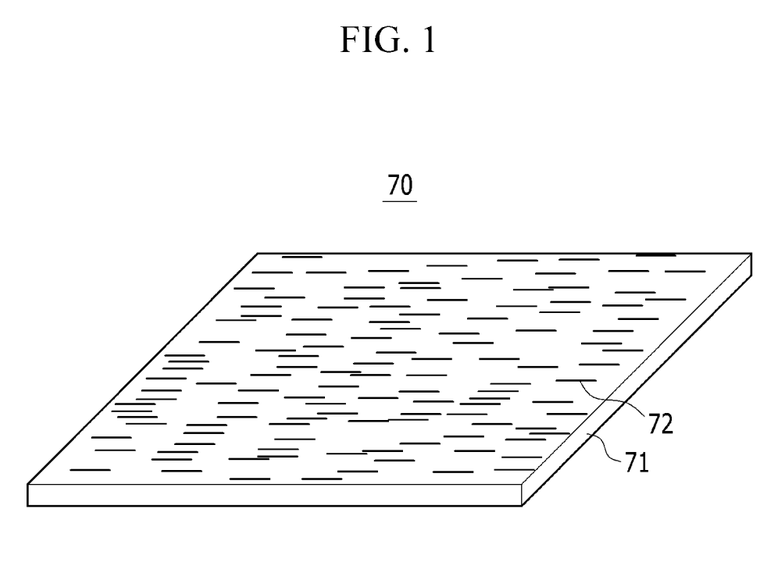
FIG. 1 is schematic view of a polarization film according to an embodiment.

FIG. 1 is schematic view of a polarization film according to an embodiment.

Referring to FIG. 1, a polarization film 70 according to an embodiment includes a polymer resin 71 and a dichroic dye 72.

The polymer resin 71 may be a hydrophobic polymer resin, for example, a polyolefin such as polyethylene ("PE"), polypropylene ("PP"), and a copolymer thereof; a polyamide such as nylon and an aromatic polyamide; a polyester such as polyethylene terephthalate ("PET"), polyethylene terephthalate glycol ("PETG"), and polyethylene naphthalate; a polyacrylic such as polymethyl(meth)acrylate; a polystyrene such as polystyrene ("PS") and an acrylonitrile-styrene copolymer; a polycarbonate; a vinyl chloride-based resin; a polyimide; a sulfone resin; a polyethersulfone; a polyether-etherketone; a polyphenylene sulfide; a vinyl alcohol resin; a vinylidene chloride resin; a vinylbutyral resin; an allylate resin; a polyoxymethylene; an epoxy resin; a copolymer thereof; or a combination thereof.

In an embodiment, the polymer resin 71 may be, for example, polyethylene ("PE"), polypropylene ("PP"), polyethylene terephthalate ("PET"), polyethylene terephthalate glycol ("PETG"), nylon, a copolymer thereof, or a combination thereof.

The polymer resin 71 may be, for example, a mixture of at least two polymers selected from polyethylene ("PE"), polypropylene ("PP"), and a polyethylene-polypropylene ("PE-PP") copolymer, and in an embodiment, a combination of polypropylene ("PP") and a polyethylene-polypropylene ("PE-PP") copolymer.

The polypropylene ("PP") may have, for example, a melt flow index ("MFI") of about 0.1 gram (g)/10 minute (min) to about 5 g/10 min. Herein, the melt flow index ("MFI") shows the amount of a polymer in a melt state flowing per 10 minutes, and relates to viscosity of the polymer in a melt state. In other words, as the melt flow index ("MFI") is lower, the polymer has higher viscosity, while as the melt flow index ("MFI") is higher, the polymer has lower viscosity. When the polypropylene has a melt flow index ("MFI") within the foregoing range, properties of a final product as well as workability may be effectively improved. In an embodiment, the polypropylene may have a melt flow index ("MFI") ranging from about 0.5 g/10 min to about 5 g/10 min.

The polyethylene-polypropylene ("PE-PP") copolymer may include about 1 percent by weight ("weight %") to about 50 weight % of an ethylene group based on the total amount of the copolymer. When the polyethylene-polypropylene ("PE-PP") copolymer includes the ethylene group within the foregoing range, phase separation of the polypropylene and the polyethylene-polypropylene ("PE-PP") copolymer may be effectively prevented or suppressed. In addition, the polyethylene-polypropylene ("PE-PP") copolymer may improve an elongation ratio during elongation as well as have excellent light transmittance and alignment, improving polarization characteristics. In an embodiment, the polyethylene-polypropylene ("PE-PP") copolymer may include an ethylene group in an amount of about 1 weight % to about 25 weight % based on the total amount of the copolymer.

The polyethylene-polypropylene ("PE-PP") copolymer may have a melt flow index ("MFI") ranging from about 5 g/10 min to about 15 g/10 min. When the polyethylene-polypropylene ("PE-PP") copolymer has a melt flow index ("MFI") within the foregoing range, properties of a final product as well as workability may be effectively improved. In an embodiment, the polyethylene-polypropylene ("PE-PP") copolymer may have a melt flow index ("MFI") ranging from about 10 g/10 min to about 15 g/10 min.

The polymer resin 71 may include the polypropylene ("PP") and the polyethylene-polypropylene copolymer ("PE-PP") in a weight ratio of about 1:9 to about 9:1. When the polypropylene ("PP") and the polyethylene-polypropylene ("PE-PP") copolymer are included within the ratio range, the polypropylene may be prevented from crystallizing and may have excellent mechanical strength, thus effectively improving the haze characteristic. In an embodiment, the polymer resin 71 may include the polypropylene ("PP") and the polyethylene-polypropylene ("PE-PP") copolymer in a weight ratio of about 4:6 to about 6:4, and in another embodiment, in a weight ratio of about 5:5.

The polymer resin 71 may have a melt flow index ("MFI") ranging from about 1 g/10 min to about 15 g/10 min. When the polymer resin 71 has a melt flow index ("MFI") within the foregoing range, the polymer resin 71 may not only secure excellent light transmittance since crystals are not excessively formed in the resin, but may also have appropriate viscosity for manufacturing a film and thus have improved workability. In an embodiment, the polymer resin 71 may have a melt flow index ("MFI") ranging from about 5 g/10 min to about 15 g/10 min.

The polymer resin 71 may have haze ranging from less than or equal to about 5%. When the polymer resin 71 has haze within the foregoing range, transmittance may be increased, and thus excellent optical properties may be secured. In an embodiment, the polymer resin 71 may have haze of less than or equal to about 2%, and in another embodiment, about 0.5% to about 2%.

The polymer resin 71 may have crystallinity of less than or equal to about 50%. When the polymer resin 71 has crystallinity within the foregoing range, the polymer resin 71 may have lower haze and accomplish excellent optical properties. In an embodiment, the polymer resin 71 may have crystallinity of about 30% to about 50%.

The polymer resin 71 may have light transmittance of greater than or equal to about 85% in a wavelength region of about 380 nm to about 780 nm. The polymer resin 71 may be elongated in a uniaxial direction. The direction may be the longitudinal direction of the dichroic dye 72.

The dichroic dye 72 may be distributed (for example, dispersed) into the polymer resin 71 and aligned in the elongation direction of the polymer resin 71. The dichroic dye 72 may be a material that transmits one perpendicular polarization component out of two perpendicular polarization components in a predetermined wavelength region.

The dichroic dye 72 may be represented by the following Chemical Formula 1.

Chemical Formula 1

In Chemical Formula 1, $Ar^1$ is a substituted or unsubstituted C6 to C15 arylene group, $Ar^2$ is a C6 to C15 arylene group substituted with at least one of a substituted or unsubstituted C1 to C20 alkyl group, a substituted or unsubstituted C1 to C20 alkoxy group, a halogen atom and a halogen-containing group, $Ar^3$ is a C6 to C15 arylene group substituted with an amide group, $R^1$ is a substituted or unsubstituted C1 to C20 alkyl group or a substituted or unsubstituted C1 to C20 alkoxy group,

$R^2$ and $R^3$ are each independently a substituted or unsubstituted C1 to C20 alkyl group, or $R^2$ and $R^3$ are linked to each other to form a ring, and n is 1 or 2.

The C6 to C15 arylene group may be a phenylene group, a naphthylene group, or a biphenylene group.

In Chemical Formula 1, Ar³ may be a C6 to C15 arylene group substituted with an acetamide group. Ar³ may be a di-substituted C6 to C15 arylene group, for example a C6 to C15 arylene group substituted with an amide group and a substituted or unsubstituted C1 to C20 alkoxy group.

The dichroic dye 72 may be represented by the following Chemical Formula 2.

Chemical Formula 2

In Chemical Formula 2,

Ar¹ is a substituted or unsubstituted C6 to C15 arylene group, $R^a$ is a substituted or unsubstituted C1 to C20 alkyl group, a substituted or unsubstituted C1 to C20 alkoxy group, a halogen atom, or a halogen-containing group, $R^b$ is hydrogen or a substituted or unsubstituted C1 to C20 alkoxy group, $R^c$ is a substituted or unsubstituted C1 to C20 alkyl group, R¹ is a substituted or unsubstituted C1 to C20 alkyl group or a substituted or unsubstituted C1 to C20 alkoxy group,

R² and R³ are each independently a substituted or unsubstituted C1 to C20 alkyl group, or R² and R³ are linked to each other to form a ring, and n is 1 or 2.

The C6 to C15 arylene group may be a phenylene group, a naphthylene group, or a biphenylene group.

In Chemical Formula 2, $R^c$ may be a methyl group.

The dichroic dye 72 may be, for example represented by one of the following Chemical Formulae 3 to 6.

Chemical Formula 3

Chemical Formula 4

Chemical Formula 5

Chemical Formula 6

The dichroic dye 72 may be used singularly or in a mixture of two or more.

The dichroic dye 72 may be included in an amount of about 0.01 to about 5 parts by weight based on a total of 100 parts by weight of the polymer resin 71. When the dichroic dye 72 is included within the foregoing range, sufficient polarization properties may be obtained without deteriorating transmittance of a polarization film. The dichroic dye 72 may be included in an amount of about 0.05 to about 1 part by weight within the range based on a total of 100 parts by weight of the polymer resin 71.

The polarization film 70 may be a melt blend of the polymer resin 71 and the dichroic dye 72. The melt blend may be obtained by melt-blending a composition for a polarization film including the polymer resin 71 and the dichroic dye 72 at a temperature of greater than or equal to a melting point ("$T_m$") of the polymer resin 71. The composition for a polarization film may include the above-described polymer resin 71 and dichroic dye 72. The polymer resin 71 and the dichroic dye 72 are respectively a solid type such as a powder. The composition for a polarization film may include, for example, a solid content of greater than or equal to about 90 weight % but not a solvent.

A difference between a solubility parameter of the hydrophobic polymer resin 71 and a solubility parameter of the dichroic dye 72 may be less than or equal to about 8.0. The solubility parameter illustrates an interaction degree to which two or more compounds interact. The smaller solubility parameter difference the compounds have, the larger degree of interaction they have, while the larger solubility parameter difference the compounds have, the smaller degree of interaction they have. Within the foregoing range, a difference between a solubility parameter of the hydrophobic polymer resin 71 and a solubility parameter of the dichroic dye 72 may be less than or equal to about 7.4.

The solubility parameter has a relation with the structure of a compound. When the dichroic dye 72 and the polymer resin 71 have a solubility parameter difference within the foregoing range, the polymer resin 71 and the dichroic dye 72 have high degree of interaction during the manufacture of a polarization film, and may increase the melt-blending property and thus prevent agglomeration of the dichroic dyes 72 and uniformly disperse the dichroic dye 72 in the polymer resin 71.

When the polymer resin 71 is a polyolefin, a solubility parameter of the polyolefin may be about 15 to about 18. When the dichroic dye 72 is used with the polyolefin, a solubility parameter of the dichroic dye 72 may be less than or equal to about 24, for example about 15 to about 24.

The polarization film 70 may be manufactured by melt-blending and elongating the composition for a polarization film.

In an embodiment, the polarization film 70 may be manufactured by, for example, melt-blending a composition for a polarization film including the polymer resin and the dichroic dye, putting the composition in the melt blend and pressing it into a sheet, and elongating the sheet in a uniaxial direction.

The melt-blending may be performed at a temperature of less than or equal to about 300° C., and in an embodiment, ranging from about 50 to about 300° C.

The sheet may be formed by putting the melt blend in the mold, and pressing it with a high pressure or discharging it in a chill roll through a T-die.

The elongation in a uniaxial direction may be performed at a temperature ranging from about 30 to about 200° C. at an elongation rate ranging from about 400% to about 1,000%. The elongation rate refers to a length ratio of after the elongation to before the elongation of the sheet, and means the elongated extent of the sheet after uniaxial elongation.

The polarization film 70 may have a dichroic ratio of about 3 to about 10 at a maximum absorption wavelength ("$\lambda_{max}$") in a visible ray region. Herein, the dichroic ratio may be calculated by dividing plane polarization absorbance in a vertical direction with the axis of a polymer by polarization absorbance in a horizontal direction according to the following Equation 1.

$$DR = \mathrm{Log}(1/T_\perp)/\mathrm{Log}(1/T_\parallel) \qquad \text{Equation 1}$$

In Equation 1,

DR denotes a dichroic ratio of a polarization film, $T_\parallel$ is light transmittance of light entering parallel to the transmissive axis of a polarization film, and $T_\perp$ is light transmittance of light entering perpendicular to the transmissive axis of the polarization film.

The dichroic ratio shows to what degree the dichroic dyes 72 are arranged in the polarization film 70 in one direction. When the polarization film 70 has a dichroic ratio within the foregoing range in the wavelength region, the dichroic dyes 72 are arranged according to arrangement of the polymer chains, improving polarization properties of the polarization film 70.

The polarization film 70 may have polarization efficiency of greater than or equal to about 90%, and in an embodiment, ranging from about 95% to about 100% within the range. Herein, the polarization efficiency may be obtained by the following Equation 2.

$$PE\ (\%) = [(T_\parallel - T_\perp)/(T_\parallel + T_\perp)]^{1/2} \times 100 \qquad \text{Equation 2}$$

In Equation 2,

PE denotes polarization efficiency, $T_\parallel$ is transmittance of light entering parallel to the transmissive axis of a polarization film, and $T_\perp$ is transmittance of light entering perpendicular to the transmissive axis of the polarization film.

The polarization film 70 may have light transmittance of greater than or equal to about 30%, and in an embodiment, ranging from about 30% to about 95% within the range. When the polarization film 70 having light transmittance within the foregoing ranges is applied to one side of a display device, light emitting from the display device may not be prevented.

The polarization film 70 may have a relatively low thickness of less than or equal to about 100 micrometers ("μm"), and for example, ranging from about 30 μm to about 95 μm. The polarization film 70 has a thickness within the foregoing ranges, and thus may be thinner than a polarization plate requiring a protective layer such as triacetyl cellulose ("TAC") and contribute to realizing a thin display device.

The polarization film may be applied to various display devices.

The display device may be a liquid crystal display ("LCD").

Figure 2:
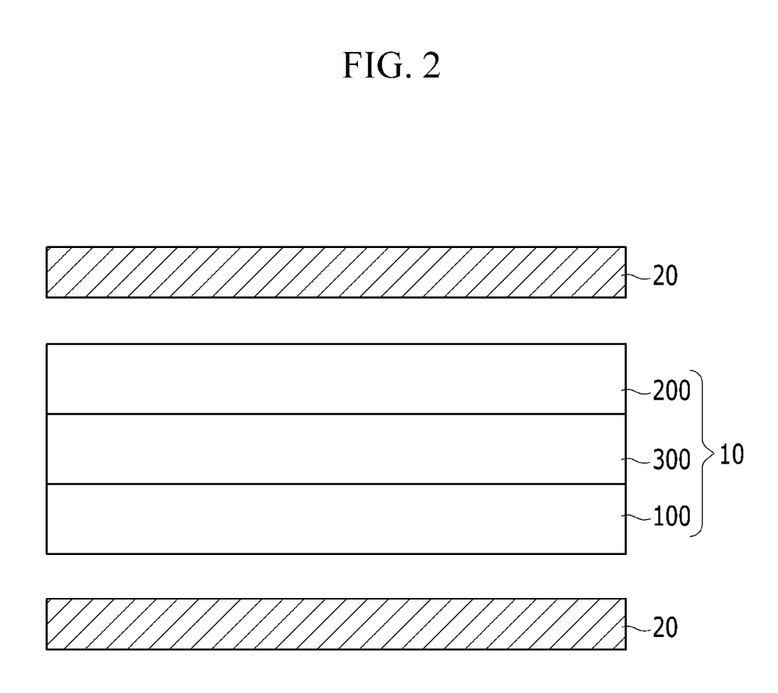
FIG. 2 is a cross-sectional view showing a liquid crystal display ("LCD") according to an embodiment.

FIG. 2 is a cross-sectional view showing a liquid crystal display ("LCD") according to an embodiment.

Referring to FIG. 2, the liquid crystal display ("LCD") includes a liquid crystal panel 10 and a polarization film 20 disposed on both the lower part and the upper part of the liquid crystal display panel 10.

The liquid crystal panel 10 may be a twist nematic ("TN") mode panel, a patterned vertical alignment ("PVA") mode panel, an in-plane switching ("IPS") mode panel, an optically compensated bend ("OCB") mode panel, and the like.

The liquid crystal display panel 10 includes a first display panel 100, a second display panel 200, and a liquid crystal layer 300 interposed between the first display panel 100 and the second display panel 200.

The first display panel 100 may include, for example, a thin film transistor (not shown) formed on a substrate (not shown) and a first electric field generating electrode (not shown) connected thereto. The second display panel 200 may include, for example, a color filter (not shown) formed on a substrate and a second electric field generating electrode (not shown). However, it is not limited thereto, and the color filter may be included in the first display panel 100, and both the first electric field generating electrode and the second electric field generating electrode may be disposed in the first display panel 100.

The liquid crystal layer 300 may include a plurality of liquid crystal molecules. The liquid crystal molecules may have positive or negative dielectric anisotropy. When the liquid crystal molecules have positive dielectric anisotropy, the long axis thereof may be aligned substantially parallel to the surface of the first display panel 100 and the second display panel 200 when not applying an electric field, and may be aligned substantially perpendicular to the surface of the first display panel 100 and the second display panel 200 when applying an electric field. On the contrary, when the liquid crystal molecules have negative anisotropy, the long axis thereof may be aligned substantially perpendicular to the surface of the first display panel 100 and the second display panel 200 when not applying an electric field, and may be aligned substantially parallel to the surface of the first display panel 100 and the second display panel 200 when applying an electric field.

The polarization film 20 is disposed on the outside of the liquid crystal display panel 10. Although it is shown to be disposed on the upper part and lower part of the liquid crystal display panel 10 in the drawing, it may be formed on either the upper part or the lower part of liquid crystal display panel 10.

The polarization film 20 includes a polymer resin and a dichroic dye, which are the same as described above.

The display device may be an organic light emitting diode ("OLED") device.

Figure 3:
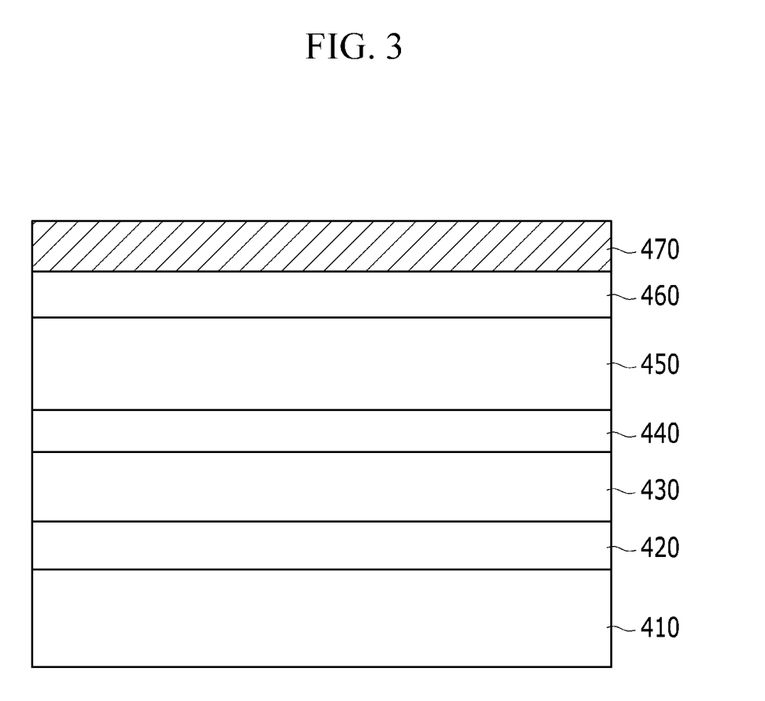
FIG. 3 is a cross-sectional view an organic light emitting diode ("OLED") device according to an embodiment.

FIG. 3 is a cross-sectional view an organic light emitting diode ("OLED") device according to an embodiment.

Referring to FIG. 3, an organic light emitting diode ("OLED") device according to an embodiment includes a base substrate 410, a lower electrode 420, an organic emission layer 430, an upper electrode 440, an encapsulation substrate 450, a compensation film 460, and a polarization film 470.

The base substrate 410 may be formed of glass or plastic.

Either of the lower electrode 420 and the upper electrode 440 may be an anode, while the other is a cathode. The anode is an electrode where holes are injected, and is formed of a transparent conductive material having a high work function and externally transmitting entered light, for example, ITO or IZO. The cathode is an electrode where electrons are injected, is formed of a conducting material having a low work function and having no influence on an organic material, and is selected from, for example, aluminum (Al), calcium (Ca), and barium (Ba).

The organic emission layer 430 includes an organic material emitting light when a voltage is applied between the lower electrode 420 and the upper electrode 440.

An auxiliary layer (not shown) may be included between the lower electrode 420 and the organic emission layer 430 and between the upper electrode 440 and the organic emission layer 430. The auxiliary layer may include at least one of a hole transport layer ("HTL"), a hole injection layer ("HIL"), an electron injection layer ("EIL"), and an electron transport layer ("ETL") for balancing electrons and holes.

The encapsulation substrate 450 may be made of glass, metal, or a polymer. The lower electrode 420, the organic emission layer 430, and the upper electrode 440 are sealed to prevent moisture and/or oxygen from externally flowing in.

The compensation film 460 may circularly polarize light passing through the polarization film 470 and generate a phase difference, and thus have an influence on reflection and absorption of the light. In an embodiment, the compensation film 460 may be, for example, a phase difference film such as λ/4 plate, and may be omitted depending on the case.

The polarization film 470 may be disposed at a display screen. For example, the polarization film 470 may be disposed outside of the base substrate 410 in a bottom emission type in which light emits from the base substrate 410, and outside of the encapsulation substrate 450 in a top emission type in which light emits from the encapsulation substrate 450.

The polarization film 470 includes a polymer resin and a dichroic dye. The polarization film 470 may play a role of a light absorption layer absorbing external light and thus prevent display characteristic deterioration due to reflection of the external light.

The compensation film 460 and polarization film 470 may be disposed at a display screen of an organic light emitting diode ("OLED") device and thus may play a role of an antireflective film preventing reflection of light flowing in from the outside. The antireflective film may prevent visibility deterioration due to the light flowing in from the outside.

Hereinafter, the embodiments are illustrated in more detail with reference to examples. However, they are exemplary embodiments, and the present invention is not limited thereto.

SYNTHESIS OF DICHROIC DYE

Synthesis Example 1

1-1. Synthesis of Monoazo Compound 10 g (41.1 mmol) of 4-(4-nitrophenylazo)phenol (TCI, Japan) is dissolved in 200 mL of acetone, and 8.5 mL (48.9 mmol) of 1-bromooctane and 11.4 g (82.5 mmol) of potassium carbonate ($K_2CO_3$) are added thereto. The reaction mixture is refluxed and agitated at 60° C. for 24 hours and then cooled down to room temperature. The agitated mixture is concentrated and purified through silica gel column chromatography ($CH_2Cl_2$:n-hexane=2:1), to give 12.3 g (34.6 mmol) of a 4-nitro compound. A yield of the compound is 84%.

5.7 g (16.0 mmol) of the 4-nitrocompound is dissolved in 150 mL of hot ethanol, and a solution prepared by dissolving 11.5 g (47.9 mmol) of $Na_2S.9H_2O$ in hot ethanol and water is added thereto. The resulting mixture is agitated at 80° C. for 5 hours and cooled down to room temperature. Then, a precipitated crystal is filtered, washed several times with water, and dried, to give 4.3 g (13.2 mmol) of 4-amino-4'-octyloxyazobenzene. A yield of the compound is 82%.

The 4-amino-4'-octyloxyazobenzene is analyzed by $^1H$ NMR.

The $^1H$ NMR analysis result is as follows.

1H NMR (300 MHz, CDCl3) δ(ppm): 0.89 (t, J=6.9 Hz, 3 H, CH3), 1.26-1.34 (m, 8 H, CH2×4), 1.45-1.49 (m, 2 H, CH2), 1.57-1.83 (m, 2 H, CH2), 3.98 (br s, 2 H, NH2), 4.02 (t, J=6.6 Hz, 2 H, OCH2), 6.74 (d, J=8.9 Hz, 2 H, ArH), 6.97 (d, J=8.9 Hz, 2 H, ArH), 7.76 (d, J=8.9 Hz, 2 H, ArH), 7.82 (d, J=8.9 Hz, 2 H, ArH).

1-2. Synthesis of Bisazo Compound 2 g (6.15 mmol) of the 4-amino-4'-octyloxyazobenzene is dissolved in 120 mL of dimethyl acetamide (DMAc) and 30 mL of acetic acid (AcOH), and 3 mL of 12N HCl is added thereto. The mixture is maintained at 0° C. Then, 446 mg (6.46 mmol) of sodium nitrate ($NaNO_2$) is dissolved in 2 mL of water to prepare a solution. The solution is slowly added by drops to the reaction mixture. When the addition is complete, the reactant is agitated for one hour while being maintained at 0° C. Next, a solution prepared by dissolving 6.15 mmol of 3-methylaniline (m-toluidine) in 150 mL of methanol is slowly added by drops to the mixture. The resulting mixture is agitated at 0° C. for 1 hour. Then, the agitated mixture is neutralized with a sodium hydroxide (NaOH) aqueous solution. When the reaction is complete, a precipitated solid therein is filtered. The remaining mixture is purified through silica gel column chromatography, to give a bisazo compound. A yield of the compound is 60 to 80%.

1-3. Synthesis of Triazo Compound 1 mmol of the bisazo compound is dissolved in 20 mL of dimethyl acetamide (DMAc) and 5 mL of acetic acid (AcOH), and 5 mL of 12N HCl is added thereto. The mixture is maintained at 0° C. Next, a solution prepared by dissolving 72 mg (1.04 mmol) of sodium nitrate ($NaNO_2$) in 1 mL of water and slowly added by drops to the reaction mixture. When the addition is complete, the reactant is agitated for one hour while being maintained 0° C. Next, a solution prepared by dissolving 206 mg (1 mmol) of 3-diethylaminophenylacetamide (N-(3-(diethylamino)phenyl)acetamide) in 25 mL of methanol, and 2 mL of dimethyl acetamide (DMAc) is slowly added by drops to the reaction mixture. The resulting mixture is agitated at 0° C. for one hour. The agitated mixture is neutralized with a sodium hydroxide (NaOH) aqueous solution. When the reaction is complete, a precipitated solid is filtered. The remaining mixture is purified through silica gel column chromatography (n-hexane:EtOAc=3:1), to give 449 mg (0.68 mmol) of a triazo dichroic dye represented by the following Chemical Formula 3a. The yield is 68%.

Chemical Formula 3a

The dichroic dye represented by the above Chemical Formula 3a is analyzed by $^1H$ NMR.

The $^1H$ NMR analysis result is as follows.

$^1H$ NMR (300 MHz, CDCl3) δ(ppm): 0.90 (t, J=6.8 Hz, 3H, $CH_3$), 1.22-1.36 (m, 14 H, $CH_2 \times 4$, $CH_3 \times 2$), 1.45-1.49 (m, 2H, $CH_2$), 1.81-1.86 (m, 2H, $CH_2$), 2.29 (s, 3H, Ac), 2.85 (s, 3H, $CH_3$), 3.49 (q, J=14.0, 6.9, 4H, $CH_2 \times 2$), 4.06 (t, J=6.6 Hz, 2 H, $OCH_2$), 6.50 (dd, J=9.3, 2.7 Hz, 1 H, ArH), 7.02 (d, J=9.0 Hz, 2H, ArH), 7.66-8.14 (m, 11 H, ArH).

Synthesis Example 2

419 mg (0.62 mmol) of a dichroic dye represented by the following Chemical Formula 4a is prepared according to the same method as Synthesis Example 1, except for using 3-methoxy aniline instead of 3-methylaniline in the process of synthesizing of a bisazo compound. The yield is 62%.

The dichroic dye represented by the above Chemical Formula 4a is analyzed by $^1H$ NMR.

The $^1H$ NMR analysis result is as follows.

$^1H$ NMR (300 MHz, $CDCl_3$) δ(ppm): 0.90 (t, J=6.7 Hz, 3 H, $CH_3$), 1.22-1.36 (m, 14 H, $CH_2 \times 4$, $CH_3 \times 2$), 1.45-1.51 (m, 2 H, $CH_2$), 1.80-1.86 (m, 2 H, $CH_2$), 2.29 (s, 3 H, Ac), 3.50 (q, J=14.1, 7.0, 4 H, $CH_2 \times 2$), 4.06 (t, J=6.6 Hz, 2 H, $OCH_2$), 4.15 (s, 3 H, $OCH_3$), 6.50 (dd, J=9.2, 2.7 Hz, 1 H, ArH), 7.02 (d, J=9.0 Hz, 2 H, ArH), 7.51-8.14 (m, 11 H, ArH).

Synthesis Example 3

425 mg (0.64 mmol) of a dichroic dye represented by the following Chemical Formula 5a is prepared according to the same method as Synthesis Example 1, except for using 3-fluoroaniline instead of 3-methylaniline in the process of synthesizing of a bisazo compound. The yield is 64%.

Chemical Formula 4a

Chemical Formula 5a

The dichroic dye represented by the Chemical Formula 5a is analyzed by $^1$H NMR.

The $^1$H NMR analysis result is as follows.

$^1$H NMR (300 MHz, CDCl$_3$) δ(ppm): 0.90 (t, J=6.7 Hz, 3 H, CH$_3$), 1.22-1.36 (m, 14 H, CH$_2$×4, CH$_3$×2), 1.45-1.51 (m, 2 H, CH$_2$), 1.80-1.86 (m, 2 H, CH$_2$), 2.30 (s, 3 H, Ac), 3.51 (q, J=14.2, 7.1, 4 H, CH$_2$×2), 4.06 (t, J=6.6 Hz, 2 H, OCH$_2$), 6.50 (dd, J=9.1, 2.7 Hz, 1 H, ArH), 7.02 (d, J=9.0 Hz, 2 H, ArH), 7.78-8.19 (m, 11 H, ArH).

Synthesis Example 4

449 mg (0.65 mmol) of a dichroic dye represented by the following Chemical Formula 6a is prepared according to the same method as Synthesis Example 1, except for using 3-diethylamino-4-methoxyphenylacetamide (N-(3-(diethylamino)-4-methoxyphenyl)acetamide) instead of 3-diethylaminophenylacetamide. The yield is 65%.

Chemical Formula 6a

The dichroic dye represented by the Chemical Formula 6a is analyzed by $^1$H NMR.

The $^1$H NMR analysis result is as follows.

$^1$H NMR (300 MHz, CDCl$_3$) δ(ppm): 0.90 (t, J=6.7 Hz, 3 H, CH$_3$), 1.19-1.36 (m, 14 H, CH$_2$×4, CH$_3$×2), 1.45-1.51 (m, 2 H, CH$_2$), 1.80-1.86 (m, 2 H, CH$_2$), 2.29 (s, 3 H, Ac), 2.86 (s, 3 H, CH$_3$), 3.44 (q, J=14.1, 7.1, 4 H, CH$_2$×2), 3.91 (s, 3 H, OCH$_3$), 4.06 (t, J=6.5 Hz, 2 H, OCH$_2$), 7.02 (d, J=9.0 Hz, 2 H, ArH), 7.37 (s, 1 H, ArH), 7.77-8.25 (m, 10 H, ArH).

Evaluation 1: Solubility Parameter

Solubility parameters of the dichroic dyes according to Synthesis Examples 1 to 4 and Comparative Synthesis Example 1 are calculated.

The solubility parameters are Hildebrand solubility parameters.

Intermolecular cohesion is a combination of Van der Waals and dipole moments inside molecules, and energy causing such cohesion is referred to as cohesive energy ("Ecoh"). Such cohesive energy may be changes of internal energy per 1 mole, and may be represented by the following Relationship Equation 1.

$$E_{coh} = \Delta U = \Delta H - \Delta T \quad \text{Relationship Equation 1}$$

In Relationship Equation 1,
$E_{coh}$ is cohesive energy,
ΔU is changes of internal energy per 1 mole,
ΔH is enthalpy changes, and
ΔT is temperature changes.

Cohesive energy per unit volume may be defined as cohesive energy density ("CED"), which may be obtained by the following Relationship Equation 2.

$$CED = (\Delta H - RT)/Vm \quad \text{Relationship Equation 2}$$

In Relationship Equation 2,
CED is a cohesive energy density,
ΔH is enthalpy changes, R is a gas constant,
T is a temperature, and
Vm is a mole volume.

The cohesive energy density is used to define the solubility parameter that numerically indicates dissolution performance by Hildebrand, and the solubility parameter may be calculated by the following Relationship Equation 3 using a density or mole volume at a predetermined temperature.

$$\delta = (CED)^{0.5} = (\Sigma Ecoh_i/\Sigma Vm_i)^{0.5} \quad \text{Relationship Equation 3}$$

In Relationship Equation 3,
δ is a solubility parameter,
CED is a cohesive energy density,
$Ecoh_i$ is cohesive energy for a functional group i inside a molecule, and
$Vm_i$ is a molar volume of the i functional group on the molecule.

Hildebrand solubility parameter values used for designing a structure of a dichroic dye may be calculated by group contribution of molecules.

The group contribution of cohesive energy ("Ecoh") and mole volume ("Vm") used for calculating a solubility parameter of a dichroic dye is shown in Table 1, in accordance with *Polym. Eng. Sci.* 1974, 14, 147; *J. Appl. Polym. Sci.* 2005, 96, 416, the content of which is incorporated herein by reference in its entirety.

TABLE 1

| Group | Ecoh (J/mol) | Vm (cm$^3$/mol) |
|---|---|---|
| —CH$_3$ | 4707 | 33.5 |
| —CH$_2$— | 4937 | 16.1 |
| —CH— | 3431 | −1.0 |
| C | 1464 | −19.2 |
| H$_2$C= | 4310 | 28.5 |
| —CH= | 4310 | 13.5 |
| C= | 4310 | −5.5 |

TABLE 1-continued

| Group | Ecoh (J/mol) | Vm (cm³/mol) |
|---|---|---|
| Phenyl | 31,924 | 71.4 |
| Phenylene (o, m, p) | 31,924 | 52.4 |
| Phenyl (trisubstituted) | 31,924 | 33.4 |
| Phenyl (tetrasubstituted) | 31,924 | 14.4 |
| Phenyl (pentasubstituted) | 31,924 | −4.6 |
| Phenyl (hexasubstituted) | 31,924 | −23.6 |
| Ring closure 5 or more atoms | 1046 | 16.0 |
| Ring closure 3 or 4 atoms | 3138 | 18.0 |
| —COOH | 27,614 | 28.5 |
| —CO$_2$— | 17,991 | 18.0 |
| —CO— | 17,364 | 10.8 |
| —CONH— | 33,472 | 9.5 |
| —NH$_2$ | 12,552 | 19.2 |
| —NH— | 8368 | 4.5 |
| N | 4184 | −9.0 |
| —N= | 11,715 | 5.0 |
| —N=N— | 4188 | 0.0 |
| —CN | 25,522 | 24.0 |
| NO$_2$ | 15,355 | 32.0 |
| —O— | 3347 | 3.8 |
| —OH | 29,790 | 10.0 |
| S | 14,142 | 12.0 |
| —F | 4184 | 18.0 |
| —Cl | 11,548 | 24.0 |
| —Br | 15,481 | 30.0 |
| —I | 19,037 | 31.5 |

Solubility parameter of the dichroic dyes according to Synthesis Example 1 to 4 which are calculated by a Hildebrand solubility parameter are shown in Table 2.

TABLE 2

| | Solubility parameter |
|---|---|
| Synthesis Example 1 | 22.6 |
| Synthesis Example 2 | 22.7 |
| Synthesis Example 3 | 22.9 |
| Synthesis Example 4 | 22.1 |

Manufacturing Polarization Film

Example 1

A composition for a polarization film is prepared by mixing a polyolefin (solubility parameter: 16.6) including polypropylene ("PP") and a polypropylene-polyethylene ("PP-PE") copolymer in a ratio of 5:5 (weight/weight), and 0.5 parts by weight of the dichroic dye according to the Synthesis Example 1 based on 100 parts by weight of the polyolefin.

The composition for a polarization film is melt-kneaded at about 250° C. using a micro-compounder ("DSM"). The melt blend is put in a sheet mold and pressed at a high temperature and a high pressure, manufacturing a film. The film is elongated 1,000% in a uniaxial direction (Instron Ltd.) at 125° C., manufacturing a polarization film.

Example 2

A polarization film is manufactured according to the same method as Example 1, except for using the dichroic dye according to Synthesis Example 2 instead of the dichroic dye according to Synthesis Example 1.

Example 3

A polarization film is manufactured according to the same method as Example 1, except for using the dichroic dye according to Synthesis Example 3 instead of the dichroic dye according to Synthesis Example 1.

Example 4

A polarization film is manufactured according to the same method as Example 1, except for using the dichroic dye according to Synthesis Example 4 instead of the dichroic dye according to Synthesis Example 1.

Evaluation 2: Polarization Characteristic

The polarization films according to Examples 1 to 4 are evaluated regarding transmittance, polarization efficiency, and dichroic ratio.

The transmittance is evaluated using a V-7100 UV/Vis spectrophotometer (JASCO Inc.).

The transmittance is evaluated by respectively measuring light transmittance of light entering parallel to the transmissive axis of the polarization film and light transmittance of light entering perpendicular to the transmissive axis of the polarization film.

The transmittance is used to calculate a dichroic ratio ("DR") and polarization efficiency ("PE").

The dichroic ratio ("DR") is obtained according to the following Equation 1.

$$DR = \mathrm{Log}(1/T_\perp)/\mathrm{Log}(1/T_{//}) \qquad \text{Equation 1}$$

In Equation 1,
DR denotes a dichroic ratio,
$T_{//}$ is transmittance for light entering parallel to the transmissive axis of a polarization film, and
$T_\perp$ is transmittance for light entering perpendicular to the transmissive axis of the polarization film.

The polarization efficiency is obtained according to the following Equation 2.

$$PE\ (\%) = [(T_{//} - T_\perp)/(T_{//} + T_\perp)]^{1/2} \times 100 \qquad \text{Equation 2}$$

In Equation 2,
PE denotes polarization efficiency,
$T_{//}$ is transmittance for light entering parallel to the transmissive axis of a polarization film, and
$T_\perp$ is transmittance for light entering perpendicular to the transmissive axis of the polarization film.

Figure 4:
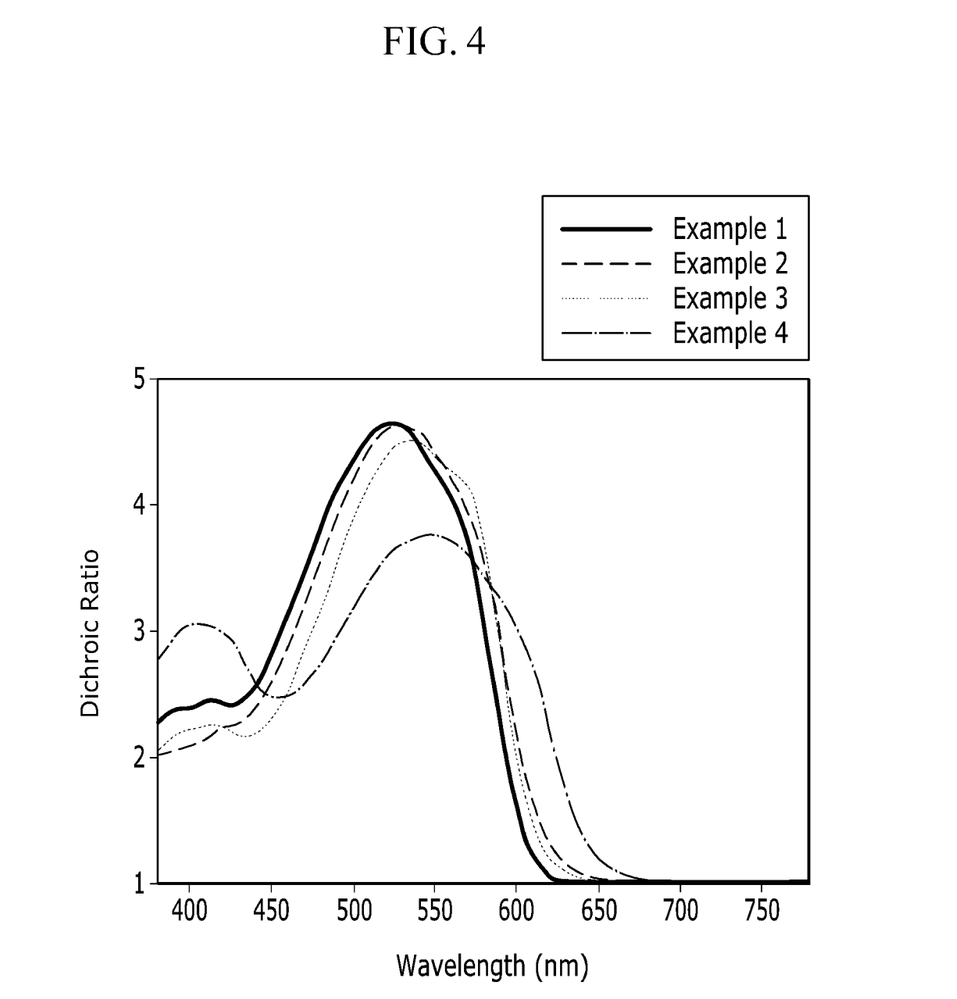
FIG. 4 is a graph of dichroic ratio (DR) versus wavelength (nanometer) showing dichroic ratios in a visible ray region according to the polarization films according to Examples 1 to 4.

The results are illustrated referring to Table 3 and FIG. 4.

FIG. 4 is a graph showing dichroic ratios in a visible ray region according to the polarization films according to Examples 1 to 4.

In Table 3, light transmittance, polarization efficiency, and dichroic ratio of the polarization films according to Examples 1 to 4 are measured at the maximum absorption wavelength ("$\lambda_{max}$").

TABLE 3

| | $\lambda_{max}$ (nm) | Transmittance (Ts, %) | Polarization efficiency (PE, %) | Dichroic ratio (DR) | Solubility parameter difference (dye-polyolefin) |
|---|---|---|---|---|---|
| Example 1 | 525 | 34.74 | 99.60 | 4.6 | 6.0 |
| Example 2 | 525 | 35.56 | 99.32 | 4.6 | 6.1 |
| Example 3 | 530 | 37.10 | 98.88 | 4.5 | 6.3 |
| Example 4 | 550 | 33.53 | 98.45 | 3.8 | 5.5 |

Referring to Table 3 and FIG. 4, the polarization films according to Example 1 to 4 show polarization efficiency of greater than or equal to 90% and dichroic ratios of greater than or equal to 3.0 while satisfying light transmittance of greater than or equal to 30%.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A polarization film, comprising:
   a hydrophobic polymer resin; and
   a dichroic dye represented by Chemical Formula 1, Chemical Formula 1 wherein, in Chemical Formula 1,
$Ar^1$ is a substituted or unsubstituted C6 to C15 arylene group,
$Ar^2$ is a C6 to C15 arylene group substituted with at least one of a substituted or unsubstituted C1 to C20 alkyl group, a substituted or unsubstituted C1 to C20 alkoxy group, a halogen atom and a halogen-containing group,
$Ar^3$ is a C6 to C15 arylene group substituted with an amide group,
$R^1$ is a substituted or unsubstituted C1 to C20 alkoxy group,
$R^2$ and $R^3$ are each independently a substituted or unsubstituted C1 to C20 alkyl group, or $R^2$ and $R^3$ are linked to each other to form a ring, the substituted C1 to C20 alkyl group of $R^2$ and $R^3$ being a C1 to C20 alkyl group substituted with a halogen, a C1 to C20 alkoxy group, a C1 to C20 alkylthio group, a cyano group, an amino group, a C1 to C20 alkyl group, or a C1 to C20 aryl group, and
n is 2,
wherein the dichroic dye is dispersed in the hydrophobic polymer resin, and the hydrophobic polymer resin is elongated in a uniaxial direction by about 400 percent to about 1,000 percent;
wherein the polarization film has a polarization efficiency of greater than or equal to about 90%, and wherein the polarization efficiency is obtained by Equation 2:

$$PE\ (\%) = [(T_\parallel - T_\perp)/(T_\parallel + T_\perp)]^{1/2} \times 100$$  Equation 2 wherein, in Equation 2,
PE denotes polarization efficiency,
$T_\parallel$ is a transmittance of light entering parallel to a transmissive axis of the polarization film, and
$T_\perp$ is a transmittance of light entering perpendicular to the transmissive axis of the polarization film.

2. The polarization film of claim 1, wherein the C6 to C15 arylene group is a phenylene group, a naphthylene group, or a biphenylene group.

3. The polarization film of claim 1, wherein $Ar^3$ is a C6 to C15 arylene group substituted with an acetamide group.

4. The polarization film of claim 1, wherein $Ar^3$ is a C6 to C15 arylene group substituted with an amide group and a substituted or unsubstituted C1 to C20 alkoxy group.

5. The polarization film of claim 1, wherein the dichroic dye is represented by Chemical Formula 2:

Chemical Formula 2 wherein, in Chemical Formula 2,
$Ar^1$ is a substituted or unsubstituted C6 to C15 arylene group,
$R^a$ is a substituted or unsubstituted C1 to C20 alkyl group, a substituted or unsubstituted C1 to C20 alkoxy group, a halogen atom, or a halogen-containing group,
$R^b$ is hydrogen or a substituted or unsubstituted C1 to C20 alkoxy group,
$R^c$ is a substituted or unsubstituted C1 to C20 alkyl group,
$R^1$ is a substituted or unsubstituted C1 to C20 alkoxy group,
$R^2$ and $R^3$ are each independently a substituted or unsubstituted C1 to C20 alkyl group, or $R^2$ and $R^3$ are linked to each other to form a ring, the substituted C1 to C20 alkyl group of $R^2$ and $R^3$ being a C1 to C20 alkyl group substituted with a halogen, a C1 to C20 alkoxy group, a C1 to C20 alkylthio group, a cyano group, an amino group, a C1 to C20 alkyl group, or a C1 to C20 aryl group, and
n is 2.

6. The polarization film of claim 1, wherein the dichroic dye is represented by one of Chemical Formulae 3 to 6:

Chemical Formula 3

Chemical Formula 4

-continued

Chemical Formula 5 or

Chemical Formula 6

7. The polarization film of claim 1, wherein the hydrophobic polymer resin comprises a polyolefin, a polyamide, a polyacryl, a polystyrene, a polyester, a polycarbonate, a polyimide, a copolymer thereof, or a combination thereof.

8. The polarization film of claim 7, wherein the hydrophobic polymer resin is a polyolefin, and
the polyolefin is a combination of polypropylene and a polyethylene-polypropylene copolymer.

9. The polarization film of claim 1, wherein the dichroic dye has a solubility parameter of less than or equal to about 24.

10. The polarization film of claim 1, wherein a difference between a solubility parameter of the hydrophobic polymer resin and a solubility parameter of the dichroic dye is less than or equal to about 8.0.

11. The polarization film of claim 1, wherein the dichroic dye is included in an amount of about 0.01 to about 5 parts by weight, based on 100 parts by weight of the hydrophobic polymer resin.

12. The polarization film of claim 11, wherein the dichroic dye is included in an amount of about 0.05 to about 1 part by weight, based on 100 parts by weight of the hydrophobic polymer resin.

13. The polarization film of claim 1, wherein the polarization film has a dichroic ratio of about 3 to about 10 at maximum absorption wavelength in a visible wavelength region, and
the dichroic ratio is represented by Equation 1:

$$DR = \mathrm{Log}(1/T_\perp)/\mathrm{Log}(1/T_\parallel) \quad \text{Equation 1}$$

wherein, in Equation 1,
DR denotes a dichroic ratio of a polarization film,
$T_\parallel$ is a transmittance of light entering parallel to a transmissive axis of the polarization film, and
$T_\perp$ is a transmittance of light entering perpendicular to the transmissive axis of the polarization film.

14. The polarization film of claim 1, wherein the polarization film comprises a melt blend of the hydrophobic polymer resin and the dichroic dye.

15. An antireflective film comprising
the polarization film according to claim 1, and
a compensation film.

16. A display device comprising the polarization film according to claim 1.

17. The display device of claim 16, wherein the display device is a liquid crystal display or an organic light emitting diode device.

18. The polarization film of claim 1, wherein the dichroic dye is represented by Chemical Formula 2:

Chemical Formula 2 wherein, in Chemical Formula 2,
$Ar^1$ is a substituted or unsubstituted C6 to C15 arylene group,
$R^a$ is a substituted or unsubstituted C1 to C20 alkyl group, a substituted or unsubstituted C1 to C20 alkoxy group, a halogen atom, or a halogen-containing group,
$R^b$ is hydrogen,
$R^c$ is a substituted or unsubstituted C1 to C20 alkyl group,
$R^1$ is a substituted or unsubstituted C1 to C20 alkoxy group,
$R^2$ and $R^3$ are each independently an unsubstituted C1 to C20 alkyl group, or $R^2$ and $R^3$ are linked to each other to form a ring, and
n is 2.

* * * * *